United States Patent [19]

Mosso

[11] 4,052,300
[45] Oct. 4, 1977

[54] PROCESS AND DEVICE FOR THE FILTRATION OF LIQUIDS POLLUTED BY SUSPENDED SOLID BODIES

[75] Inventor: Franco Achille Mosso, Monza (Milan), Italy

[73] Assignee: Italba, S.p.A., Milan, Italy

[21] Appl. No.: 690,133

[22] Filed: May 26, 1976

Related U.S. Application Data

[63] Continuation of Ser. No. 527,596, Nov. 27, 1974, abandoned.

[51] Int. Cl.² .............................................. B01D 23/24
[52] U.S. Cl. ...................................... 210/20; 210/80; 210/82; 210/266; 210/275; 210/284
[58] Field of Search .................... 210/20, 80, 82, 256, 210/261, 262, 263, 264, 266, 275, 284, 290, 314, 315, 317, 333, 335, 342

[56] References Cited

U.S. PATENT DOCUMENTS

| | | | |
|---|---|---|---|
| 1,675,860 | 7/1928 | Neumann | 210/20 |
| 2,244,626 | 6/1941 | Kingston | 210/261 |
| 3,313,725 | 4/1967 | Tsuda et al. | 210/261 |
| 3,471,025 | 10/1969 | Dobson | 210/290 |

FOREIGN PATENT DOCUMENTS 16,710 6/1904 United Kingdom ................. 210/261

Primary Examiner—Wilbur L. Bascomb, Jr.
Assistant Examiner—Ivars Cintins
Attorney, Agent, or Firm—Norman E. Saliba

[57] ABSTRACT

This invention describes apparatus and process for filtering liquids by employing a vertical cylindrical container divided by an immovable non-porous plate into a separate top and bottom chamber with each chamber containing a bed of filter material. The liquid to be filtered is passed upwardly through the buoyant filter material of the top chamber and then passed in series through the filter material contained in the bottom chamber. Conduit means for passing the liquid from the top chamber to the bottom chamber is located internally of the cylindrical container; passing directly through the said immovable separating plate.

5 Claims, 4 Drawing Figures

PROCESS AND DEVICE FOR THE FILTRATION OF LIQUIDS POLLUTED BY SUSPENDED SOLID BODIES

This application is a continuation of application Ser. No. 527,596 filed Nov. 27, 1974 now abandoned.

This present invention relates to a process and a device for the filtration of liquids polluted by suspended solid bodies.

It is known in the art, for example in the filtration of water, to pass water through a more or less thick layer of granular material, flowing from the top downwards, for the purpose of depositing the suspended substances in the water, within the said layer. When the filtering layer is entirely filled-in, thus resulting in a loss of load of the filter, a regeneration is carried out, in particular by employing air and/or water under counter-current, flow, that is in an upward direction. The function of the air and of the water differently combined, is to cause a relative motion among the grains of the filter, and consequently a mechanical rubbing action which in turn will promote the removal of the substances which are deposited thereon. Moreover, an expansion of the filter will occur, such as to allow the back-washing water to take away by entrainment the suspended substances released from the filter. This is possible if the speed of entrainment upwards of the back-washing flow is higher than the speed, (according to Stoke's law) with which the suspended particles drop into the water, considering their diameter and their specific gravity. The back-washing speed should not however be greater than the speed of decantation of the filtering material, thus preventing their concomitant removal from the filter together with the polluting suspended substances.

One disadvantage of the conventional filter is that raw polluting substances with a decantation speed greater than that of the granular filtering medium, will deposit onto it, and may not be further removed. A further disadvantage is that high concentrations of polluting matter, also when restricted within the time, will cause rapid clogging localized within the first centimeters or decimeters of the filter, and thus will require the necessity of washing the filter, while a major portion of the volume of the filter is still integral and not used.

Different manners have been used for the purpose of obviating the aforesaid disadvantages, however without attaining satisfactory results. For example, efforts have been made for overcoming the second disadvantage, through the use of filtering means differentiated from the top downwards: that is, positioning at the top the filter with larger diameter and lower specific gravity, and progressively decreasing, running down to the filter, the diameter and increasing the specific gravity. However, this solution does not obviate the first of the two disadvantages, and moreover the selection of the filtering granulated materials as to the sizes and the weight must be very carefully done for the purpose of permitting a back-washing condition common and optimum for the whole. Finally, the physical changement of the related specific gravity will require, after short periods of operation, some variations in the performance of one or more of the layers with respect to the parameters which govern the back-washing, thus resulting a partial or total mixing of layers of different sizes and a consequent impairing of the said advantages.

The main object of this present invention is therefore to obviate the two foresaid disadvantages, allowing both the expansion and the relative action of granulated materials capable of permitting a very large co-volume, that is such as to reach an entrapment, with equal volume, of a high amount of suspended solids, and/or being easily regenerated uner back-washing at variable intervals, taking advantage of the fact that the suspended solids, generally having a specific gravity higher than 1, will tend to settle spontaneously.

A further object of this present invention is to provide a process and a device for filtering which is very simple and easy to manufacture with material commonly available on the market at a low cost.

The above objects, as well as other advantages will be seen from the following description, and are obtained by means of a process for filtering liquids polluted by suspended solids, characterized in that it comprises: the filtration of the polluted liquid by making it flow from the bottom upwards through at least a filtering pack with a speed at least sufficient for compacting the filtering pack into a chamber having decreasing dimensions in the direction of the flow of liquid to be filtered, the said chamber, having at least the bottom of the top portion permeable to the liquids but not to the filtering pack; the making of the back-washing from the top downwards, of the said filtering pack, in a manner as to cause the temporary expansion of the said filtering pack and the decantation from top downwards of the filtered polluting particles.

Other characteristics and advantages of the invention will be understood from the description of some embodiments given below, by way of non limitative example, and with reference to the accompanying drawings, in which.

The filtration process, particularly for water polluted by suspended solids, is carried out through the devices illustrated in the said figures. It comprises two steps: a first actual filtering step wherein the polluted water is made to flow through a filtering pack or filter from the bottom upwards. The speed of the raw water to be filtered shall be such as to be capable of compacting the filter (consisting of an agglomerate of particles not bounded together) into a proper chamber. The speed of the raw water shall be higher than that of decantation of the filtering material. Of course, the chamber into which the filtering pack is compacted shall be open at the bottom and closed at the sides in a manner as to not be permeable with respect to the filter, but however permeable with respect to the filtered liquid. During the second step, the washing of the filter in counter-current flow is carried out at regular intervals for the purpose of removing the impurities or polluting particles accumulated therein. The washing will take place from the top downwards, thus causing the temporary expansion of the filtering pack, and consequently permitting the removal of the polluting particles.

Figure 1:
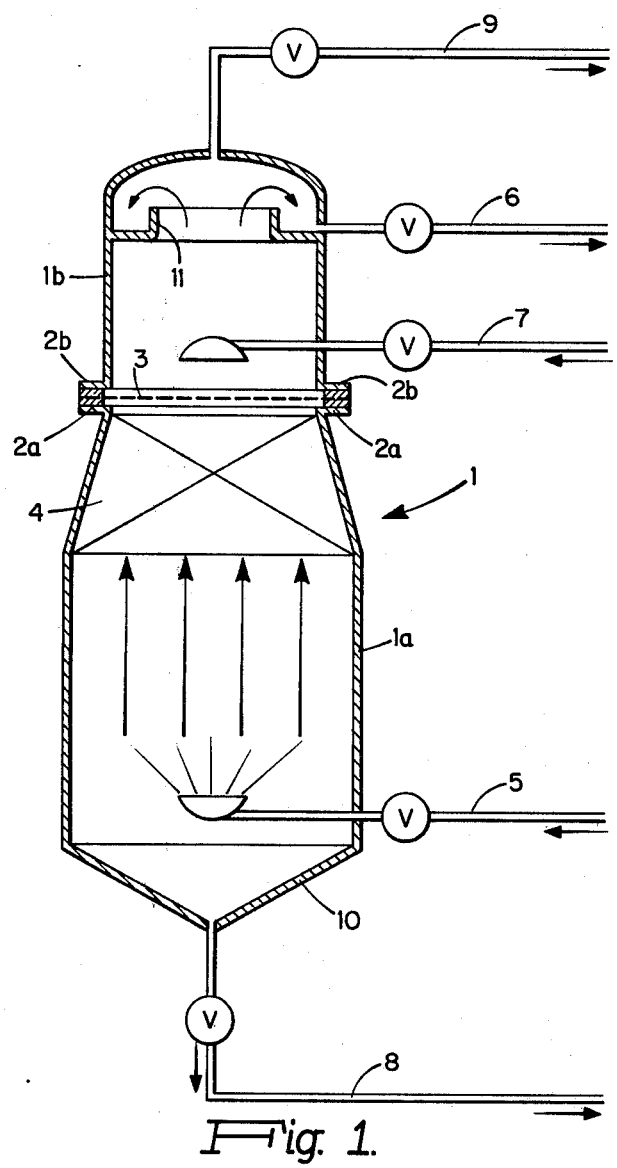
FIG. 1 shows a first preferred embodiment of the invention.

The process now described is carried out by means of a plurality of devices which are preferred examples of this present invention. FIG. 1 shows a first embodiment. This figure illustrates a box-like body 1 closed and made of two half-bodies 1a and 1b engaged one respect the other at the correspondence of flange expansions 2a and 2b, respectively. The said box-like body 1 is substantially arranged with vertical symmetry axis, and the said half-body 1a, before the connecting area of the flange, shows in particular a truncated cone portion having upwardly decreasing dimension and formed at the upper portion with a plate member 3 perpendicular with respect to the symmetry axis of the said box 1, and secured in place between the said flanges 2a and 2b, the said plate member 3 being permeable to the liquid to be filtered (water in this instance) and along with the walls of the half-body 1a forming the said truncated cone portions, it defines a chamber whereby, when the device is under operating condition, a filtering pack or filter 4, is formed therein. The filtering material is preferably comprised of plastic or other granulate of organic or inorganic nature, having the shape of small cylinders or spheroids, with a specific gravity less than that of the fluid to be filtered (water in this instance) such that the speed of the fluid to be filtered is higher than the speed of decantation of the filtering pack. Moreover, FIG. 1 shows an inlet line 5 for the raw water, a collection line 6 for the filtered water, and an inlet pipe 7 for the washing fluid, and finally a discharge pipe 8 for the washing fluid and for the polluting particles collected during the washing. The said lines and the side pipes are arranged, with respect to the filtering pack 4, in such a manner as to carry out the filtration by means of flowing the raw water from the bottom upwards, along with the washing by means of flowing fluid in a downwards dirction. At the upper portion, the box-like body 1 is equipped with a vent 9, while at the lower portion, it is equipped with a hopper 10 vented into the discharge pipe 8. It will be observed that, within the said box-like body, a manifold 11 is located adjacent to the mouth-piece of the said pipe 6 used for the collecton of the filtered liquid.

The said device operates as follows: the raw water, flowing from the inlet line 5, is fed from the bottom upwards through the filtering pack 4 having a real and apparent specific gravity which is less than or at the most equal to that of the fluid to be filtered. The filtering pack 4 is maintained fixed at the top by means of the plate member 3, which may be of the porous, nozzle or wire gauze type and which with the cooperation of the specific gravity and of the kinetic force of the fluid to be filtered tending to make it float. The coarser suspended solids will not reach the filtering pack, but will decant or settle immediately into the said hopper 10 of the box-like body 1, from which they are periodically removed. The finer and light suspended solids will enter the filtering pack to a depth which will vary according to their size, their specific gravity, speed of filtration and granulometry of the filtering layer. The filtered water is withdrawn from the manifold 11, through the collecting pipe 6. The finer and light solids which enter into the filtering pack are ejected by means of backwashing from the top downwards with air and/or water flowing from the inlet line 7.

Under these conditions, in contrast to the conventional filters, the direction of the back-washing fluid will coincide with the natural direction of motion under the resting condition of the substances suspended and subjected to the force of gravity. The back-washing flow will cause the sediment entrapped by the filter to collect into the lower hopper 10, from which the said sediment is periodically discharged, through the discharge pipe 8.

The hereinabove embodiment of the invention may be carried out by a modification of the filtering pack. In fact, the latter may consists of two layers: a first layer located (under operating conditions) at the lowest portion of the said chamber, consisting of coarse granular material, and a second layer, located at the upper portion, of a similar material but having a finer size and a lesser specific gravity. In such a manner, the overlaying arrangement of the two said layers will occur spontaneously and automatically, as a result of the effect of the differences of the specific gravity of the particles involved. The coarse grain of the first layer will prevent a rapid clogging thus permitting the finer polluting particles to penetrate up to and in the second layer, the material which constitutes the smaller granulometry.

Figure 2:
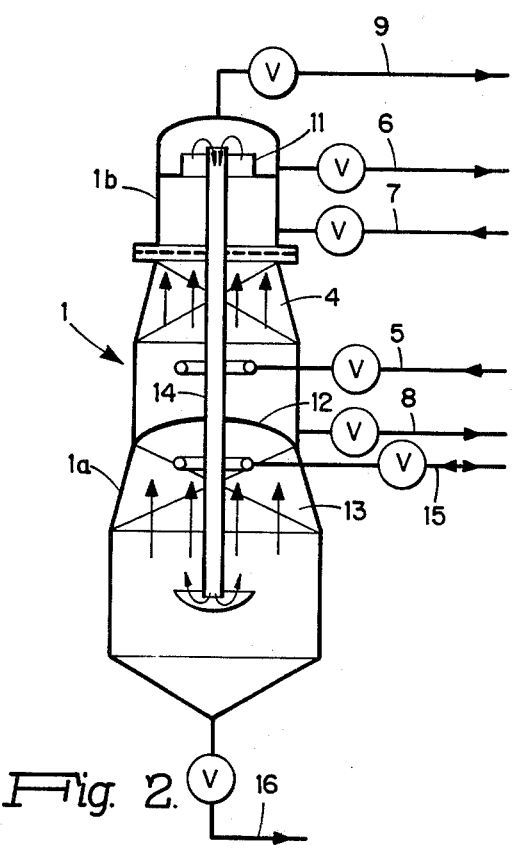
FIGS. 2, 3 and 4 are, namely, a second, third and a fourth embodiment of the invention.

A further preferred embodiment of the device is illustrated on FIG. 2. This embodiment differs when compared to the first one by the fact that it shows two filtering packs entirely separated one with respect to the other. More particularly, it should be observed that the box-like body 1, shows the half-body 1a interrupted at the lower portion by a rigid and tight-proof partition member 12. The said half-body 1a shows under the said partition member 12, another portion with cone-shaped sloping walls, for constituting a second chamber which houses a second filtering pack 13. The said second filtering pack is fed with the water filtered by the filtering pack 4 located at the top portion, of it. The said water flowing through a pipe 14 which shows the upper end in correspondence with the manifold 11 and the lower end under the second filtering pack 13.

The aforesaid embodiment will permit to make use of filtering packs having the same specific gravity, but a different granulometry for the purpose of carrying out a coarse filtration with the first filtering pack, and a fine fltration with the second one.

Figure 3:
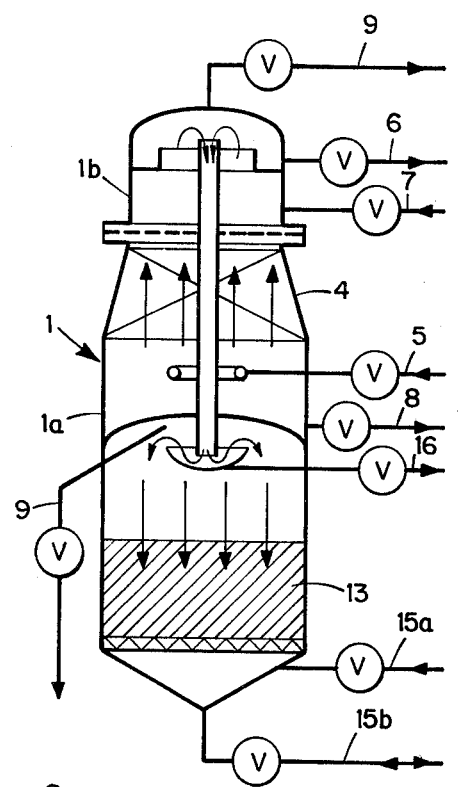
Figure 4:
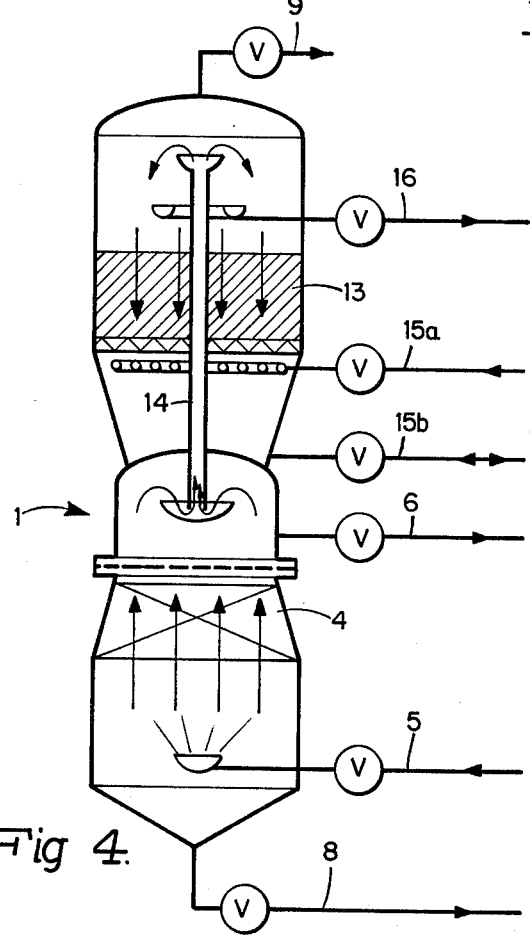

Two modifications with respect to the embodiment of FIG. 2 are illustrated in FIGS. 3 and 4. According to the said two modifications, the filtering pack 13 consists of the usual silica sand, or active carbon or anthracite, that is a material with a specific gravity greater than that of the liquid to be filtered. In this instance, the liquid is passed through the second filtering pack 13 from the top downwards and contrarily, the washing is carried out from the lower part upwards. The second filtering pack 13 is shown under the filtering pack 4 in FIG. 3, and above the said filtering pack 4 in FIG. 4. It should be observed that in FIGS. 2, 3 and 4, the inlet 15 for the washing fluid is also used as a pipe for collecting the liquid filtered.

The foregoing illustrated invention is in no way limited to the above embodiments, and many changes may be brought therein without departing from the scope of the invention itself.

For example, it may be advantageous to provide the filtering pack 4 and/or the second filtering pack 13 with electrostatic or electric charges, actually pertaining to the filtering packs or also applied to them, the said charges cancelling the Z potential of the suspended particles, and thus promoting their coagulation. Moreover, all the details may be replaced by technically equivalent elements.

Practically, both the materials and the dimensions may vary according to the requirements.

What I claim is:

1. A device for the filtration of a liquid containing suspended solids comprising a substantially vertical cylindrical container divided into a top and bottom chamber by a non-porous plate member arranged in a fixed and immovable position transversely of said container, at least the top chamber further divided into an upper and lower section by a porous plate member arranged in a fixed and immovable position transversely of said top chamber, at least the upper portion of the side walls of the said lower section formed into a truncated cone shaped portion along its verticle axis with the smaller diameter end of said truncated cone shaped portion arranged adjacent the said porous fixed plate member, a first filter bed located in said lower section of said top chamber and a second filter bed separately located in said bottom chamber, at least said first filter bed formed of a buoyant filter material having a specific gravity substantially no greater than that of water to allow said filter material during filtration to float and be compacted upwardly against said porous plate member, the said porous plate member being permeable to the passage of said liquid but not to the filter material, inlet means located below the said first filter bed in said top chamber for the passage of liquid to be filtered upwardly through said filter, liquid passage means arranged in series between said top and bottom chambers, said liquid passage means positioned internally of said cylindrical container and passing directly through said non-porous plate member separating said top chamber from said bottom chamber, outlet means for filtered liquid being located at least in said bottom chamber and inlet and outlet means in said top and bottom chamber for the passage and discharge respectively of backwashing fluid.

2. A device according to claim 1 whereby said first and second filter bed are both formed of a buoyant filter material having a specific gravity substantially no greater than that of water and wherein said first filter bed is comprised of granules of larger size than said second filter bed.

3. A device according to claim 2 wherein means are provided for passing liquid to be filtered first upwardly through said larger granular size filter bed and thereafter upwardly through said second filter bed.

4. A device according to claim 1 wherein said second filter bed is formed of a filter material having a specific gravity substantially greater than said first filter bed material and wherein means are provided for passing liquids to be filtered sequentially first upwardly through said first filter bed and thereafter downwardly through said second filter bed.

5. A process for filtering liquids containing suspended solids in a device having a substantially vertical cylindrical container divided into a top and bottom chamber by a non-porous plate member arranged in a fixed and immovable position transversely of said container, at least the top chamber further divided into an upper and lower section by a porous plate member arranged in a fixed and immovable position transversely of said top chamber, at least the upper portion of the side walls of the said lower section formed into a truncated cone shaped portion along its verticle axis with the smaller diameter end of said truncated cone shaped portion arranged adjacent the said porous fixed plate member, a first filter bed located in said lower section of said top chamber and a second filter bed separately located in said bottom chamber, the process comprising passing the said liquid in an upwardly direction through said first filter bed at a velocity sufficient to compact the filter material into a bed or pack disposed within and occupying said truncated cone shaped chamber, said filter material formed of particles having a specific gravity no greater than the said liquid being filtered, the top smaller diameter end of said truncated cone shaped chamber being permeable to the passage of liquid there through but not to the filter material, passing the effluent in series flow from said first filter bed through fluid conduit means positioned internally of said cylindrical container and passing directly through said non-porous plate member to the other chamber and through the second filter bed contained therein and removing the effluent from said second filter bed as twice filtered liquid, thereafter backwashing each of said filter beds by flowing backwashing liquid in a direction opposite to the direction employed in the filtration step and at a flow rate sufficient to cause the temporary expansion of said first filter bed to result in the separation and removal of filtered solids.

* * * * *